March 27, 1934.   W. STUEBING, JR   1,953,046
SIDE LIFT TRUCK
Original Filed Dec. 21, 1926    3 Sheets-Sheet 1

INVENTOR.
William Stuebing Jr.
BY
ATTORNEYS.

March 27, 1934.   W. STUEBING, JR   1,953,046
SIDE LIFT TRUCK
Original Filed Dec. 21, 1926   3 Sheets-Sheet 2

INVENTOR.
William Stuebing Jr.
BY
Emery Booth Janney & Varney
ATTORNEYS.

Patented Mar. 27, 1934

1,953,046

UNITED STATES PATENT OFFICE 1,953,046

SIDE LIFT TRUCK

William Stuebing, Jr., Cincinnati, Ohio, assignor, by mesne assignments, to The Yale & Towne Manufacturing Company, Stamford, Conn., a corporation of Connecticut Application December 21, 1926, Serial No. 156,102
Renewed November 25, 1930

57 Claims. (Cl. 254—10)

The present invention relates to lifting trucks of the type in which the steering and draft handle is operative to lift the load.

The invention has for an object to provide improved lifting mechanism and generally to provide an improved truck.

The nature and objects of the invention will be better understood from a consideration of a particular illustrative embodiment thereof for the purpose of which description reference should be had to the accompanying drawings forming a part hereof and in which.

Figure 4:
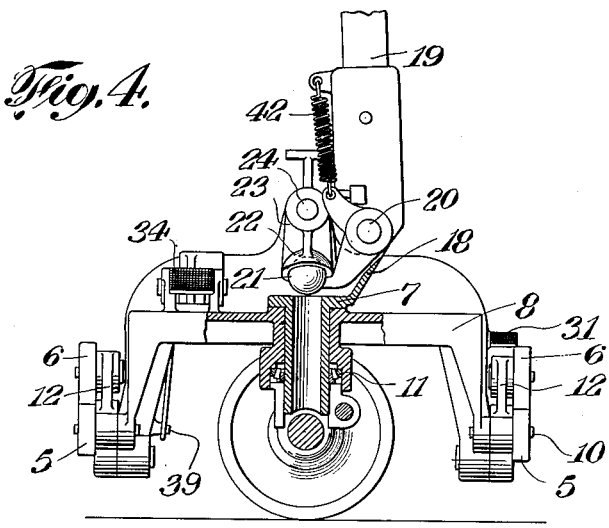
Figure 4 is a similar view in front elevation but showing the steering head turned to a position transverse to the longitudinal axis of the truck.
Figure 5:
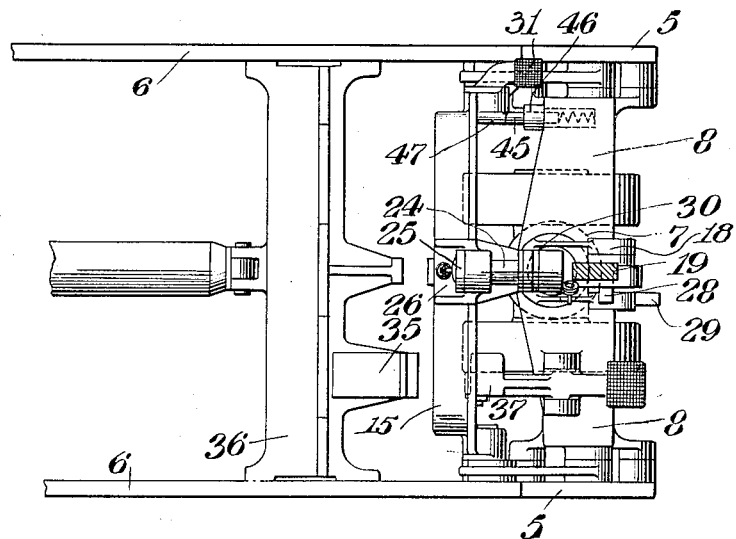
Figure 5 is a top plan view of the truck showing the elevating frame in lowermost position with the parts in position ready for lifting the load-supporting frame.

The truck shown for the purpose of illustrating the invention has a main frame including side bars 5 and a load-supporting elevating frame including side bars 6. A steering head 7 is rotatably mounted in a transverse yoke 8 forming a part of the main frame and to which yoke the side bars 5 of the main frame are rigidly connected as by means of bolts 10 as best shown in Figs. 4 and 5. A roller bearing 11 arranged to sustain both thrust and lateral stress is preferably arranged between the swivelled steering head and the yoke of the frame. The forward end of the elevating frame is supported on the main frame at the opposite sides thereof by means of similar links 12 pivotally connected to the main frame and to the elevating frame by means of bolts or other suitable pivot members 13 and 14 respectively. The links 12 are actuated by an elevating link or yoke 15 which extends laterally across the frame and substantially vertically for engagement wtih the steering lever. The elevating link 15 is pivotally connected to the supporting l'nks 12 at points 16 substantially back of the lines connecting the pivot members 13, 14 in order that the effective leverage about the pivot 13 may not be too much reduced as the elevating frame rises. This also provides an advantageous arrangement in which the power arm of the steering handle operating as a lifting lever effects an angular movement corresponding substantially to that of the lines connecting the pivots 13 and 16 during the lifting operation if the steering head is in normal position. The rear end of the elevating frame is similarly supported by links, not shown, which are of an effective length substantially equal to the distance between pivots 13 and 14 of the links 12 and similarly pivoted to the main and elevating frames.

The steering head 7 is formed with a forwardly extending yoke 18 in which the steering lever 19 is pivoted as indicated at 20 with its lower end projecting rearwardly and terminating in a ball 21 which cooperates with a socket 22 of the link 15 to provide a ball and socket joint. The socket 22 is formed in the lower end of a strut 23 secured to a pin 24 rotatably mounted in suitable bearings forming part of a bracket 40 mounted on yoke 15, Figures 1 and 2. An arm 25 is secured to the rear end of the bolt 24 to provide attachment for a spring 26 operating normally to maintain the strut 23 in vertical position. The arrangement whereby the link 15 may move pivotally as a whole forward and backward about the axis of its pivotal connection to the links 12 and whereby the socket carrying strut 23 can move laterally about the axis of pivot pin 24 affords a universal movement of the socket 22 which permits complete accommodation to all movements of the engaged end of the steering handle during the lifting operation in all steering positions of the steering head. By this arrangement the steering lever is operative in all steering positions to elevate the load thus providing what is termed a "side lift" truck. The downward movement of the steering handle may be limited by engagement of a lug 28 on one side of the steering handle with a corresponding lug 29 on the steering head.

Figure 2:
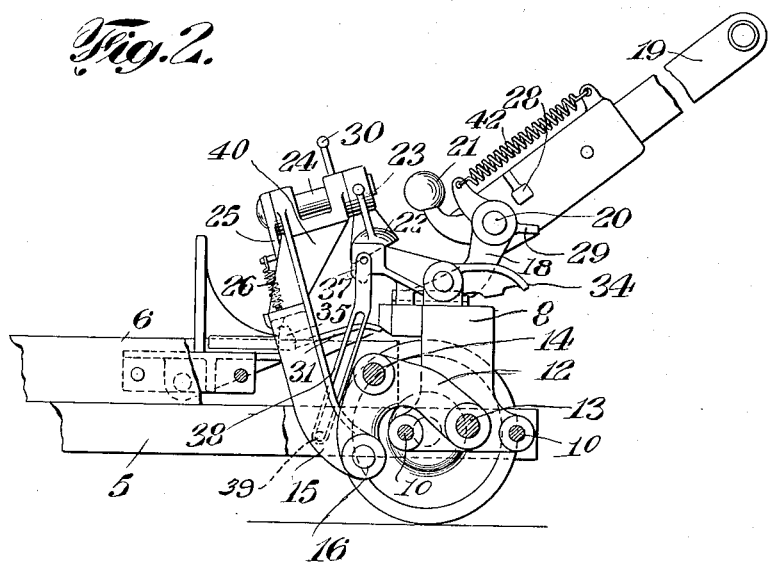
Figure 2 is a similar view of the same but showing the elevating frame in its lowermost position.
Figure 3:
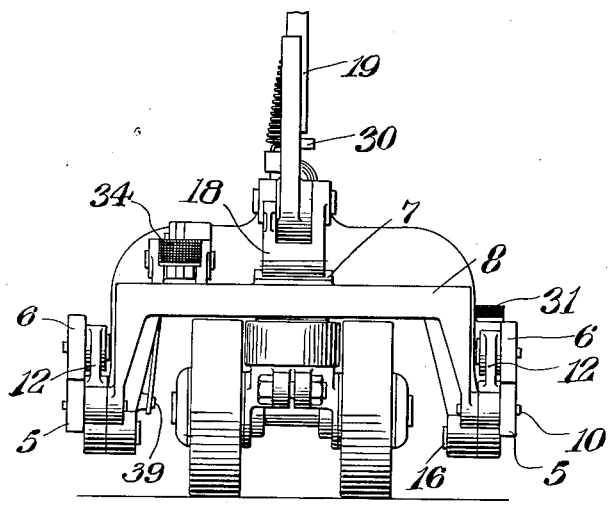
Figure 3 is a view in front elevation with the elevating frame in lowered position.
Figure 6:
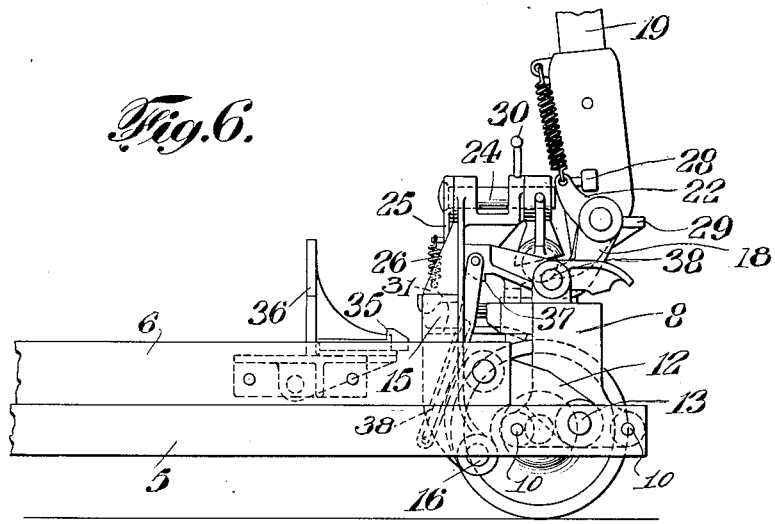
Figure 6 is a view in side elevation of the truck with the parts in the position shown in Figure 5.

In order to facilitate connecting the elevating link 15 to the steering lever by either a hand or foot movement, the link is provided at its upper end with a handle 30 and, at any position suitably exposed for foot operation, with a pedal 31 as shown at the right hand side in Figures 2 and 3. Thus the operator may, if convenient, pull upwardly and forwardly on the handle 30 to bring socket 22 into position to engage ball 21, as in Figure 6, or instead, the operator may effect the same result by placing his foot firmly on pedal 31 and moving said pedal forwardly.

Alternative means for effecting the same result include a foot operated lever 34 mounted for limited rocking movement on yoke 8 and a slotted link 38 pivoted to the rearwardly extending arm of said lever 34. A pin 39 on link 15 engages the slot of link 38 so that when said link and lever 34 are in the positions as shown in Figure 2, downward pressure on the forward end of lever 34, as produced by an operator's foot, will effect endwise or upward movement of link 38 and a resulting forward deflection of link 15 into position for socket 22 to be engaged by ball 21 on the steering lever. It will be apparent that the slot in link 38 will be sufficiently long to permit relative movement between link 15 and lever 34 during elevating operation of said elevating link 15 and that, as soon as pressure is released from the forward end of said lever 34, it will again return to normal position, or that shown in Figures 1, 2 and 6.

Figure 1:
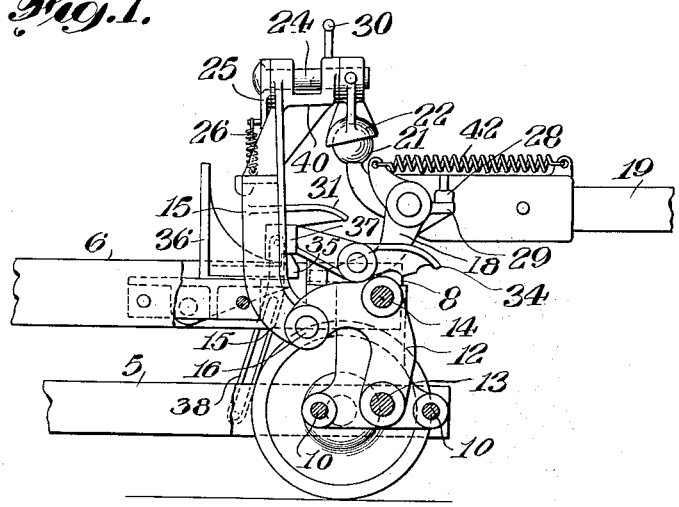
Figure 1 is a view in side elevation of a lifting truck embodying the invention, showing the elevating frame in its uppermost position and all parts in the positions assumed at the end of the elevating operation.

Lever 34 together with a downwardly extending detent or hook 37 on its rearwardly extending arm also serves the purpose of a latch for releasably holding the elevating frame in elevated position, said hook being adapted to engage a detent or hook 35 extending forwardly from cross member 36 of the elevating frame, when said frame reaches its elevated position as shown in Figure 1. The ball 21 may now be disengaged from socket 22 so that the steering tongue or lever 19 may be freely maneuvered while the truck is in motion, without disturbing the elevated position of the elevating frame. To release the frame and thus permit it to return to its lowermost position, the forward end of lever 34 is depressed, as by an operator's foot, thus disengaging hook 37 from hook 35.

When the end 21 of the steering lever is in its lowermost position, it lies substantially in the line of the axis of the steering swivel for which reason movement of the link 15 forward into the path of movement of the said end 21 will effect operative connection of the elevating means in any steering position of the steering head as indicated in Fig. 4. The weight of the elevating link 15 may be distributed relative to its pivotal connection to the elevating frame as desired, depending upon the method of operation preferred. In the truck shown the link is so balanced that when in its rearward position as shown in Fig. 2, its center of gravity is back of the pivot and the link tends to remain in that position, but when the link is moved forward into engaging position, the center of gravity is forward of the point of pivotal connection so that the link tends to remain in this position. This tendency of the link to remain in handle engaging position when once placed there eliminates the so-called "whipping handle", that is to say, the free downward movement of the handle following the accidental release from the load at the beginning of a load elevating movement. This accidental release occurs in the use of trucks designed for automatic release of the connection between the handle and the load when the operator in the act of throwing his weight on the handle gives the handle a sufficient backward movement to permit release and sometimes results in injury to the operative.

The arrangement as above described also avoids the so-called "flying handle" which results from accidental lowering of the load while the connection between the handle and load is maintained. The manner of avoidance of the flying handle will be clear from a study of Fig. 1. Assume that the handle is in normal operating position i. e., more or less elevated from the horizontal position shown and with the ball end 21 lowered out of engagement with the socket 22. Now, if the lock holding the platform elevated is tripped either intentionally or accidentally, the first part of the movement of the elevating link 15 and socket 22 is backward rather than downward so that the socket passes away from position for engagement with the ball end 21. Furthermore, in practice the link tends to swing backwardly as the elevating frame descends instead of maintaining its vertical position. This is due in part to the friction of the connection to the links 12 and in part to the inertia of the moving parts.

If desired means may be provided to cause the link 15 to be moved backward away from the steering handle automatically when the handle is released therefrom after the lifting operation. That is to say upon a slight backward movement of the handle after lifting the load, the link 15 may be arranged to automatically move to such position that it cannot be accidentally engaged by the handle. Such an arrangement is shown in Fig. 5 wherein a spring plunger 45 is maintained in a suitable boss 46 on the yoke 8 and in position to engage an opposed boss 47 on the elevating link 15 when said link approaches its elevated position. Inasmuch as this spring pressed plunger 45 is adapted to yield until the elevating link 15 reaches its uppermost position, it will not interfere with the continued engagement of said link with the steering handle during the lifting operation; but after the load reaches its uppermost position and the ball 21 is disengaged from socket 22, it will move the lifting link rearwardly to avoid any possibility of accidental connection with the steering handle in any position. The steering lever may be supported by a spring 42 connected to the swivelled steering head and to the lever, the spring being so adjusted as to tend to retain the steering lever normally in vertical position and to support a part or all of the weight of the steering lever when in use.

A hydraulic check device is preferably provided between the elevating and main frames as is usual in lifting trucks of this type.

The foregoing description of a particular embodiment of the invention is for the purpose of illustration merely and is not intended as defining the limits of the invention.

I claim:

1. A lifting truck comprising a main frame having supporting and steering wheels, an elevating frame mounted on the main frame and movable upwardly relative thereto, a vertically swinging steering lever, a tension link operatively connected to the elevating frame, said link being pivotally mounted to swing forwardly for engagement with the steering lever and to swing rearwardly out of operative engagement therewith, and means providing a releasable connection between the tension link and steering lever adapted to be engaged and to remain in engagement during the lifting operation in any steering position of the steering lever.

2. A lifting truck comprising a main frame having a steering head, an elevating frame mounted thereon, a steering lever pivoted to the steering head at a point forward of the axis of rotation of said steering head and having a rearwardly projecting end movable vertically, and a link operatively connected to the elevating frame and engageable with the end of the steering lever comprising a socket member arranged to move laterally.

3. A lifting truck comprising a main frame having a steering head, an elevating frame mounted thereon, a steering lever pivoted to the steering head and having a rearwardly projecting end, and a tension link operatively connected to the elevating frame engageable with the end of the steering lever, said link comprising a vertical member pivotally connected for movement laterally of the truck and having at its free end a socket engageable with the end of the steering lever.

4. A lifting truck comprising a main frame having a steering head, an elevating frame mounted thereon, a steering lever pivoted to the steering head and having a rearwardly projecting vertically movable end, means engageable with the end of the steering lever and operable thereby to lift the elevating frame in any steering position of the steering lever comprising a socket movable laterally and longitudinally with respect to the elevating frame while retaining its engagement with the steering handle and spring means for returning said socket to laterally central position.

5. A lifting truck comprising a main frame having a rotatable steering head, an elevating frame, links pivoted to the main frame and elevating frame, a link operatively connected to said first links and pivotally mounted to move toward and from the steering head, a vertically swinging steering handle, and means carried by said steering handle and operable in any position of the steering head to engage said link only when in position toward the steering head to lift the elevating frame.

6. A lifting truck comprising a main frame, an elevating frame, links interposed between forward end portions of said frames, said links having a pivotal connection with said main frame and said elevating frame respectively, and a lifting link mounted for substantially vertical movement during upward movement of said elevating frame and being connected to said first mentioned links rearwardly of the line between said pivotal connection thereof with said main frame and said elevating frame.

7. A lifting truck comprising a main frame, an elevating frame, pivoted links supporting the forward end of the elevating frame on the main frame and movable to substantially vertical position as the elevating frame is raised, a steering lever having a rearwardly projecting lower end, and a substantially vertical link connecting the free ends of said lever to the supporting links in such position that the line between the pivotal connection to the vertical link and the pivotal support of said links on the main frame will be substantially parallel to the line connecting the end of the steering lever and the pivot point of said steering lever during the lifting operation.

8. A lifting truck comprising a main frame, an elevating frame, pivoted links connected to and supporting the forward end of the elevating frame on the main frame and movable to substantially vertical position as the elevating frame is raised, and elevating means connected to the links at a point displaced from the connection of said links to the elevating frame and in such position that the point of connection thereto moves substantially vertically relatively to the links during the lifting of the elevating frame.

9. A lifting truck comprising a main frame having a swivelled steering head, an elevating frame mounted thereon, a steering lever pivoted to the steering head and having a rearwardly projecting vertically movable end terminating in a ball, and means for connecting said elevating frame to said steering lever to elevate the same comprising a link normally disconnected from said steering lever but having a socket movable into position for engagement with said ball in any steering position of the swivelled steering head.

10. A lifting truck comprising a main frame having a swivelled steering head, an elevating frame mounted thereon, a steering lever pivoted to the steering head and having a rearwardly projecting vertically movable end, means for connecting said elevating frame to said steering lever to elevate the latter comprising a link normally disconnected from said steering lever but movable into position for engagement with said rearwardly projecting vertically movable end of the steering lever in any steering position of the swivelled steering head, means for locking said elevating frame in elevated position, and a lever operable to move said link into position for engagement with said steering handle in any steering position of the steering head when the elevating frame is down and operable to trip said locking means when said elevating frame is in elevated position.

11. A lifting truck comprising a main frame having supporting and steering wheels, an elevating frame mounted on the main frame and movable upwardly relative thereto, a vertically swinging steering lever, a link operatively connected to the elevating frame, means to cause said link to engage and disengage the steering lever, and means forming a connection between the link and the steering lever when the said members are in engagement adapted to permit the elevating frame to be lifted in any steering position of the steering lever.

12. A lifting truck comprising a main frame having supporting and steering wheels, an elevating frame mounted on the main frame and movable upwardly relative thereto, a vertically swinging steering lever, a tension link operatively connected to the elevating frame, means to cause said link to engage the steering lever in any steering position thereof, and means to throw said link out of engagement with said steering lever upon completion of the lifting operation.

13. A lifting truck comprising a main frame having supporting and steering wheels, an elevating frame mounted on the main frame and movable upwardly relative thereto, a vertically swinging steering lever, a tension link operatively connected to the elevating frame, means to cause said link to engage the steering lever in any steering position thereof, said link being balanced to remain in engaging position, and means to cause said members to be disengaged upon completion of the lifting operation.

14. A lifting truck comprising a main frame having a rotatable steering head, an elevating frame, a member between and operatively connected to the main frame and elevating frame to raise the latter relatively to the former, a link operatively connected to said member and movable relatively to the steering head, a vertically swinging steering handle, and means permitting said handle to contact with and actuate said link to raise the elevating frame in any steering position of said handle.

15. A lifting truck comprising a main frame, an elevating frame movable upwardly and longitudinally relatively to said main frame, pivoted links supporting the elevating frame on the main frame and movable about pivots as the elevating frame is raised and moved longitudinally, and elevating means connected to the links in such position that the point of connection thereto moves substantially vertically while the point of connection between the links and the elevating frame moves both upwardly and longitudinally.

16. A lifting truck comprising, in combination, a main frame, a pivoted lifting lever, an elevating frame upwardly movable relatively to said main frame, means intermediate said lever and said elevating frame connected at one point to said lever and at another point to said elevating frame, and means operative during lifting movement of said lever to move the point of connection between said first-named means and said elevating frame into substantially vertical alignment with the connection between said lever and said first-named means.

17. A lifting truck comprising, in combination, a pivoted lifting lever, an upwardly movable elevating frame, means intermediate said lever and said elevating frame connected at one point to said lever and at another point to said elevating frame, and means operative during lifting movement of said lever to move the point of connection between said first-named means and said elevating frame into substantially vertical alignment with the connection between said lever and said first-named means.

18. A lifting truck comprising, in combination, a main frame having a pair of rear wheels, a front steering wheel having a vertical steering post journaled in said frame, a tongue mounted upon said steering post and having an extension, a platform mounted upon said frame, and elevating mechanism for said platform including an operatively unitary member pivotally connected to said tongue extension and having a portion movable substantially vertically in line with the axis of said steering post, a member bearing upon said main frame and said platform movable relative to both and directly connected to said first-named member, and means whereby the elevating mechanism may be operated when the tongue is in any usual steering position.

19. A lifting truck comprising, in combination, a main frame, a pivotally mounted steering wheel having a vertically swinging tongue secured thereto and adapted to guide the same, a portion of said tongue extending to the center of said pivotal mounting, an elevating frame, a unitary direction-changing member interconnected between said main frame and said elevating frame, and an operatively unitary member connecting said tongue with said member having a portion vertically movable in the line of the axis of said pivotal mounting whereby said tongue may be operated to elevate said elevating frame in any usual steering position.

20. A lifting truck comprising a main frame, an elevating frame, a link operatively connected to said elevating frame and having a free end, an arm mounted for angular movement on said free end and having a downwardly exposed bearing surface, a steering lever, and means on the steering lever presenting an upwardly exposed bearing surface positioned and adapted to engage said downwardly exposed bearing surface during frame elevating operation of said link at all usual steering positions of said steering lever.

21. In a lifting truck, an elevating frame, means mounting said elevating frame for upward movement relatively to other parts of the truck, a lifting lever for effecting the elevation of said frame, operatively unitary means mounted for longitudinal and vertical movement and forming part of a connection between said lever and said elevating frame and adapted to permit lifting operation of said lever in various vertical planes, and means between said second named means and said elevating frame to permit longitudinal movement of said elevating frame relatively to said second named means during the lifting operation.

22. In a lifting truck, an elevating frame, means mounting said elevating frame for upward movement relatively to other parts of the truck, a lifting lever for effecting the elevation of said frame, operatively unitary means mounted for longitudinal and vertical movement and forming part of a connection between said lever and said elevating frame and adapted to permit lifting operation of said lever in various vertical planes, and means between said second named means and said elevating frame to permit vertical movement of said elevating frame relatively to said second named means during the lifting operation.

23. In a lifting truck, an elevating frame, means mounting said elevating frame for upward movement relatively to other parts of the truck, a lifting lever for effecting the elevation of said frame, operatively unitary means connecting said lever with said elevating frame and adapted to permit lifting operation of said lever in various vertical planes, and means between said second named means and said elevating frame to permit longitudinal movement of said elevating frame relatively to said second named means during the lifting operation, said means and parts being so shaped and positioned that when said second named means is connected with said lever when the latter is in upright position, said connection automatically remains effective, while slight and upward movement of said lever in a direction opposite to its lifting movement when said elevating frame is in raised position will cause automatic disconnection.

24. A lifting truck comprising a main frame having supporting and steering wheels, an elevating frame mounted on the main frame and movable upwardly relatively thereto, a vertically swinging steering lever, a tension link operatively associated with the elevating frame, said link being movable forwardly for engagement with the steering lever and adapted to move rearwardly out of operative engagement therewith, and means forming a releasable connection between the tension link and steering lever adapted to be engaged and to remain in engagement during the lifting operation in any steering position of the steering lever.

25. A lifting truck comprising a main frame having a swivelled steering head, an elevating frame mounted thereon, a steering lever pivoted to the steering head and having a connection therewith for steering and moving the truck about, means for connecting said elevating frame to said steering lever whereby vertical movement of said steering lever is adapted to elevate said frame, said means comprising a link normally disconnected from said steering lever, but movable into position for engagement with the same in any steering position of the swivelled steering head.

26. A lifting truck comprising a main frame, an elevating frame carried thereby, a vertically swinging steering lever, and a link operably connected to the elevating frame and mounted to swing into and out of engagement with the steering lever, the link and steering lever being formed to provide a ball and socket joint at the point of inter-engagement, said link and steering lever being mutually movable into inter-engagement with one another at the will of the operator.

27. An elevating truck comprising supporting wheels and steering mechanism having a tongue mounted to swing vertically, provided with a lifting member having a free end, a load lifting platform having a load lifting unit associated therewith and extending over the free end of said lifting member and free from positive connection therewith, and cooperating means upon the free end portion of said lifting member and said load lifting unit operable by a vertical movement of said tongue when in any steering position to apply vertically a lifting force to the load lifting unit.

28. An elevating truck comprising supporting wheels and steering mechanism having a tongue mounted to swing vertically, said tongue being provided with a lifting member having a free end and movable integrally therewith, a load lifting platform having a load lifting unit associated therewith and extending over the free end of said lifting member and free from positive connection therewith, and cooperating means upon the free end portion of said lifting member and said load lifting unit operable by a vertical movement of said tongue when in any steering position to apply vertically a lifting force to the load lifting unit.

29. A lifting truck comprising, in combination, a main frame, an elevating frame, a pivoted steering and lifting lever, a mechanical leverage system interconnecting said main and elevating frames and actuable to lift the elevating frame relatively to said main frame, and means in said leverage system movable into operative relationship with a portion of said lifting lever in any regular steering position of the same whereby movement of said lever will operate said leverage system to raise the elevating frame.

30. A lifting truck comprising, in combination, a main frame, a pivoted lifting lever, an elevating frame, a lifting member normally disconnected from said lifting lever and movable relatively to the main and elevating frames into engagement therewith, means of connection between said lifting member and said elevating frame whereby operation of said member by said lever acts to lift said elevating frame, said means of connection being such that said lifting member is moved bodily relatively to said frame by said lever while moving said frame to an elevated position.

31. An elevating truck comprising a main frame, a pivotally mounted steering wheel having a tongue secured thereto and adapted to guide the same, a lifting platform, means interconnecting said main frame and said platform for supporting the platform on said frame, and mechanism operable by the operation of said tongue to actuate said interconnecting means to raise the platform when the steering wheel is in any guiding position, said mechanism being normally disconnected from said steering tongue and movable into engagement with the same.

32. In a lifting truck, an elevating frame, means mounting said frame for upward movement relatively to other parts of the truck, a lifting lever for effecting the elevation of said frame, operatively unitary means normally disconnected from the lifting lever and adapted to connect said lever with the elevating frame to permit lifting operation of said lever in various vertical planes, said means being mounted for vertical and longitudinal movement with the lever, and means connecting said operatively unitary means with the elevating frame so as to permit longitudinal displacement of said frame relatively to said means during the lifting operation.

33. In a lifting truck, in combination, a main frame, a swivelled steering head mounted on said frame, an elevating frame mounted for forward upward movement on the main frame, a steering tongue pivotally mounted on said steering head, a rearwardly extending lifting member integrally movable with said steering tongue, and a lifting link having a universal joint connection with said lifting frame and normally maintained free of said lifting member, said link being adapted to be connected to said lifting member for lifting purposes.

34. In a lifting truck, in combination, a main frame, a swivelled steering head mounted on said frame, an elevating frame mounted for forward upward movement on the main frame, a steering tongue pivotally mounted on said steering head, a rearwardly extending lifting member integrally movable with said steering tongue, and a lifting link having a universal joint connection with said lifting frame and normally maintained free of said lifting member, said link being arranged for cooperation with said lifting member in any steering position of the same.

35. In a lifting truck, in combination, a main frame, a swivelled steering head mounted on said main frame, an elevating frame mounted for forward and upward movement with respect to said main frame, a steering tongue pivotally mounted on said steering head, a rearwardly extending lifting member rigidly movable with said steering tongue, a lifting link having a universal joint connection with said elevating frame and normally maintained away from said rearwardly extending lifting member, said lifting link being cooperable and movable due to its universal connection relatively to the elevating frame into connection with said rearwardly extending lifting member in any steering position of the same for lifting purposes.

36. In a lifting truck, in combination, a main frame, a swivelled steering head mounted on said main frame, an elevating frame mounted for forward and upward movement with respect to said main frame, a steering tongue pivotally mounted on said steering head, and means normally maintained away from said steering tongue and movable to form a universal joint connection between said elevating frame and said tongue, so as to allow for lifting operation of said elevating frame by said tongue in any steering position of the tongue and at the will of the operator.

37. In a lifting truck, an elevating frame, means mounting said elevating frame for upward movement relatively to other parts of the truck, a lifting lever for effecting the elevation of said frame, an operatively unitary means having a compound lifting movement, and means between said operatively unitary means and the elevating frame to permit longitudinal movement of said means relatively to said elevating frame during lifting operation, said operatively unitary means comprising means connecting with said lifting lever for lifting operation by said lever in various vertical planes.

38. A lifting truck comprising a wheeled frame, an elevating frame carried thereby, a swinging member mounted on one of the frames, a steering head pivoted on said wheeled frame, a steering handle pivoted on said steering head and turnable therewith, means secured to the steering handle at one side of its pivot on the steering head and having a ball and socket connection with said swinging member, and means operated by the swinging member to move the elevating frame forwardly and upwardly.

39. A lifting truck comprising a wheeled frame, an elevating frame carried thereby, a swinging member mounted on one of the frames, a steering head pivoted on said wheeled frame, a steering handle pivoted on said steering head and turnable therewith, a bearing member having an upper semi-spherical surface and secured to the steering handle, a socket carried by the swinging member and in which the bearing member is adapted to be seated, and means operated by the swinging member to move the elevating frame forwardly and upwardly.

40. A lifting truck comprising a wheeled frame, an elevating frame carried thereby, a swinging member mounted on one of the frames, a steering head pivoted on said wheeled frame, a steering handle pivoted on said steering head and turnable therewith, means secured to the steering handle and affording a universal joint connection with said swinging member, and means operated by the swinging member to move the elevating frame forwardly and upwardly.

41. A lifting truck comprising a wheeled frame, an elevating frame, a crosshead carried by the wheeled frame and provided with a vertical bearing portion, a tubular king bolt having a yoke member at the lower end thereof and journaled in said bearing portion, a steering handle, means pivoting said handle to the upper end of the king bolt for vertical movement, said handle being adaptable for lateral swinging to steer the truck, and means operated by said vertical movement of the steering handle to lift the elevating frame.

42. A lifting truck comprising a wheeled frame, an elevating frame, a crosshead carried by the wheeled frame and provided with a vertical bearing portion, a tubular king bolt having a yoke member at the lower end thereof and journaled in said bearing portion, a steering handle, means pivoting said handle to the upper end of the king bolt for vertical movement, said handle being adapted for lateral swinging to steer the truck, and means operated by said vertical movement of the steering handle to lift the elevating frame, said means including a semi-spherical member secured to the handle and movable vertically above and substantially in axial alignment with said king bolt.

43. A lifting truck comprising a wheeled frame, an elevating frame carried thereby, a swinging member mounted on one of the frames, a steering head pivoted on said wheeled frame, a steering handle pivoted on said steering head and turnable therewith, means affording a universal joint between the steering handle part and the swinging member part, said means comprising a socket member and a semispherical member adapted to seat in the socket member, one of the last mentioned members being pivotally secured to the handle, and the other of said members being movable with the swinging member, and means operated by the swinging member to move the elevating frame forwardly and upwardly.

44. A lifting truck comprising a main frame having a swiveled steering head, an elevating frame mounted on the main frame, a steering lever operatively connected to said steering head, means for operatively connecting said elevating frame and said steering lever to actuate said elevating frame including a link operatively connected to said elevating frame but disconnected from said steering lever, and means for moving said link into operative position in the path of movement of a portion of said steering lever, said portion being arranged to readily engage said link when in said operative position in any steering position of said swiveled head.

45. A lifting truck comprising, in combination, a main frame, a pivoted lifting lever, an elevating frame, a member bearing at one point upon the elevating frame and at another point upon the main frame, a member bearing at one point upon said first named member and adapted to bear at another point upon said lifting lever, and means permitting said lifting lever to be swung laterally while maintaining operative relation to said second named member, whereby said lifting lever may be operated in any steering position to actuate said first named member to raise said elevating frame.

46. A lifting truck comprising, in combination, a main frame, a pivoted lifting lever, an elevating frame upwardly and longitudinally movable relatively to the main frame, a pair of side link member bearing at one point upon the elevating frame and at another point upon the main frame, means connected at one point to said side link members but displaced from the bearing points of said link members on the elevating and main frames, and at another point to said lever, whereby said first named means in cooperation with said points is movable in an approximately vertical path during elevating movement of said elevating frame.

47. A lifting truck comprising, in combination, a main frame, a pivoted lifting lever, an elevating frame upwardly movable relatively to said main frame, a pair of link members movably interconnected between said main and elevating frames, an operatively rigid member connected at a point with said pair of link members displaced from their connection with the main and elevating frames, and at another point with said pivoted lifting lever to follow the paths of movement of said link members and said lever in a direction vertical and longitudinal relative to said main frame, and means for maintaining operative contact between said lever and said operatively rigid member in various lateral positions of said lever.

48. A lifting truck comprising, in combination, a main frame, an upwardly movable elevating frame, a lever member operatively positioned between said main and elevating frames to effect the upward movement of said elevating frame, a pivoted lifting lever adapted to swing vertically and laterally and provided with a lifting member positioned to move in a general vertical path when said lifting lever is swung in a vertical plane, a non-flexible device connected at a point to an extension arm of said lever member displaced from its connection with the main and elevating frames, and at another point to said lifting member, and means permitting operative connection to be maintained between said lifting member and said non-flexible device when said lifting lever is operated in various lateral positions.

49. A lifting truck comprising, in combination, a main frame, a pivotally mounted steering wheel having a tongue secured thereto and adapted to guide the same, a platform, a unitary lever mounted upon said main frame for raising said platform, and an operatively unitary member connecting said tongue and said lever operable by the swinging of said tongue in a vertical plane to actuate said lever to raise the platform, said operatively unitary member and said tongue being separable to permit free movement of said tongue, and means for maintaining said connection when said steering wheel is in any steering position.

50. In an elevating truck, the combination of supporting and steering wheels, load supporting means carried by said wheels, means intermediate said wheels and said load supporting means permitting the latter to be raised while remaining substantially parallel to the ground, steering mechanism having a tongue pivotally mounted to swing vertically and provided with a rearward extension, a member connected to said load supporting means and normally disconnected from said steering tongue extension member, said member having a downwardly facing surface arranged to be engaged by said extension and raised to its highest position by one stroke of said tongue when the latter is depressed in any steering position, said surface being shaped to permit horizontal turning movement between it and said extension, and means independent of said extension to lock said supporting means in raised position and to permit said extension to be disengaged from said surface when said tongue is lifted.

51. A lifting truck comprising a main frame, an elevating frame, a steering lever, and elevating system associated with said main and lifting frames, and means forming a universal joint connection between said steering lever and said elevating system, said means being normally disconnected to permit free movement of the steering lever, and means for moving the same into connection with said steering lever in any steering position of the same.

52. A lifting truck comprising a main frame, an elevating frame thereon, a steering lever pivotally mounted on said main frame and having an extension portion positioned rearwardly of its pivoted mounting, and lever engaging means between said extension portion and said elevating frame normally disconnected and movable relatively to said extension portion of the lever and presenting an under surface engageable by said extension portion in any steering position of said lever during frame elevating operation thereof.

53. In a lifting truck, an elevating frame, means mounting said frame for upward movement relatively to other parts of the truck, a lifting lever for effecting the elevation of said frame, means interconnecting said lifting lever and lifting frame comprising an operatively unitary lifting means mounted so as to follow the path of operative movement of the lifting lever, said means being normally separated from said lever, means adapted to bring it into cooperation with said lever in different vertical planes, and means connecting said operatively unitary means with said lifting platform through the intermediary of at least one auxiliary lever for lifting the platform when actuated by the lifting lever, said last mentioned connecting means being arranged to permit lifting movement of the platform as determined by its mounting means while at the same time permitting a relative movement of the lifting lever operated unitary means.

54. A lifting truck comprising a main frame, an elevating frame thereon, a steering lever pivotally mounted on said main frame and provided with a lifting member movable substantially in the steering axis of the truck, elevating means secured for lifting movement with said elevating frame and free from positive connection with said member, and presenting a surface engageable by said member in any steering position of said lever for operating said elevating means, said elevating means being so mounted relatively to said elevating frame as to follow the movement of said member in the steering axis while lifting said elevating frame.

55. A lifting truck comprising a main frame, an elevating frame, a steering head, a steering lever having a lifting extension movable substantially in the axis of the steering head in any steering position, an elevating system associated with said main and lifting frames, means forming a part of said system and adapted to transmit lifting force to said system, said means being mounted for movement substantially in the steering head axis whereby to follow the movement of and to be operated readily by said lifting extension, said extension and means being normally maintained disengaged, but readily engageable and disengageable upon predetermined manipulation.

56. A lifting truck comprising a main frame, an elevating frame, a steering lever, elevating mechanism associated with said main and lifting frames, means connected to said elevating frame through at least one intermediate movable lever and forming a universal joint connection between said steering lever and said elevating system, said means being normally disconnected from the steering lever to permit free movement of said lever, and means for moving the same into connection with said steering lever in any steering position of the lever.

57. A lifting truck comprising a main frame having a swiveled steering head, an elevating frame mounted on the main frame, a steering lever operatively connected to said steering head, means for operatively connecting said elevating frame and said steering lever to actuate said elevating frame including a link operatively connected to said elevating frame but disconnected from said steering lever, and means for moving said link into operative position in the path of movement of a portion of said steering lever, said portion being arranged to readily engage said link in a definite predetermined position and relation relatively to the axis of said steering head in any steering position of said lever.

WILLIAM STUEBING, JR.